United States Patent [19]

Hotchkiss

[11] 4,053,708

[45] Oct. 11, 1977

[54] ASYNCHRONOUS SAMPLE PULSE GENERATOR

[75] Inventor: LaVerne Charles Hotchkiss, Greensboro, N.C.

[73] Assignee: Bell Telephone Laboratories, Incorporated, Murray Hill, N.J.

[21] Appl. No.: 696,872

[22] Filed: June 17, 1976

[51] Int. Cl.² .............................................. H04L 7/00
[52] U.S. Cl. .................................................. 178/69.1
[58] Field of Search .................... 178/50, 69.5 R, 69.1; 179/15 BA, 15 BV; 340/172.5; 325/321

[56] References Cited

U.S. PATENT DOCUMENTS

| | | | |
|---|---|---|---|
| 3,229,259 | 1/1966 | Barker et al. | 179/15 BA |
| 3,764,989 | 10/1973 | McClellan | 178/50 |

Primary Examiner—Thomas A. Robinson
Attorney, Agent, or Firm—Thomas Stafford

[57] ABSTRACT

Generation of pulse signals for sampling data bits incoming on one or more data channels is effected by employing a common timing signal generator in conjunction with one or more per channel units. The per channel units are associated on a one-to-one basis with the incoming data channels. Sample pulses are generated by each per channel unit independent of the other units for sampling data bits incoming on the associated channel substantially at mid-interval. This is achieved by storing first predetermined ones of the timing signals being generated when an incoming sync bit is received and comparing the stored signals with others of the timing signals being generated. The phase relationship between the stored timing signals and the others of the timing signals being compared is such that sample pulses are generated substantially mid-interval of the incoming data bits. Resynchronization on subsequently received data characters is also effected by the individual per channel units.

12 Claims, 6 Drawing Figures

ASYNCHRONOUS SAMPLE PULSE GENERATOR

BACKGROUND OF THE INVENTION

This invention relates to pulse generators and, more particularly, to generation of pulse signals for sampling asynchronously received data signals on one or more incoming channels.

Numerous arrangements have been proposed for generating signals for sampling data bits asynchronously received on one or more incoming data channels. For the most part, the prior arrangements have employed rather elaborate and complex delay line arrangements for generating sampling pulse signals which are properly related to incoming data bits on a plurality of channels. Use of such delay lines is undesirable.

Other prior arrangements have also employed logic circuits and the like to sample signals on a single incoming channel. Consequently, complete duplication of these prior circuits is necessary to accomodate generation of sampling pulses to sample data bits of a plurality of incoming data channels. Such duplication would be costly from both economic and space usage standpoints.

Thus, although prior known sample pulse generation arrangements may be useful for certain applications for sampling asynchronously received data signals, they are undesirable for others.

SUMMARY OF THE INVENTION

These and other problems are resolved in accordance with the inventive principles to be described herein in relation to a pulse generator for generating pulse signals for sampling data bits asynchronously received on one or more incoming channels.

In accordance with one aspect of the invention, a common timing signal generator is employed in conjunction with one or more so-called per channel units to generate pulse signals for sampling asynchronously received data signals on one or more associated incoming channels independent of the other channels.

More specifically, timing signals are generated having predetermined phase relationship relative to one another which are supplied to each of the one or more per channel units. Each per channel unit is responsive to a prescribed signal received on an associated incoming channel to sample and store signals representative of first predetermined ones of the timing signals. Second predetermined ones of the timing signals are compared with the stored signals to yield sample pulse signals during intervals that a coincidence occurs. The first and second predetermined ones of the timing signals are in predetermined phase relationship so that coincidence occurs at intervals which are substantially mid-interval of the individual incoming data bits on the associated channel.

In accordance with another aspect of the invention, each of the one or more per channel units includes an arrangement for reinitializing the per channel unit prior to termination of a presently received data character so that the per channel unit may synchronize immediately on the next received character.

BRIEF DESCRIPTION OF THE DRAWINGS

These and other objects and advantages of the invention will be more fully understood from the following detailed description of an embodiment of the invention taken in connection with the appended drawings in which.

DETAILED DESCRIPTION

Figure 1:
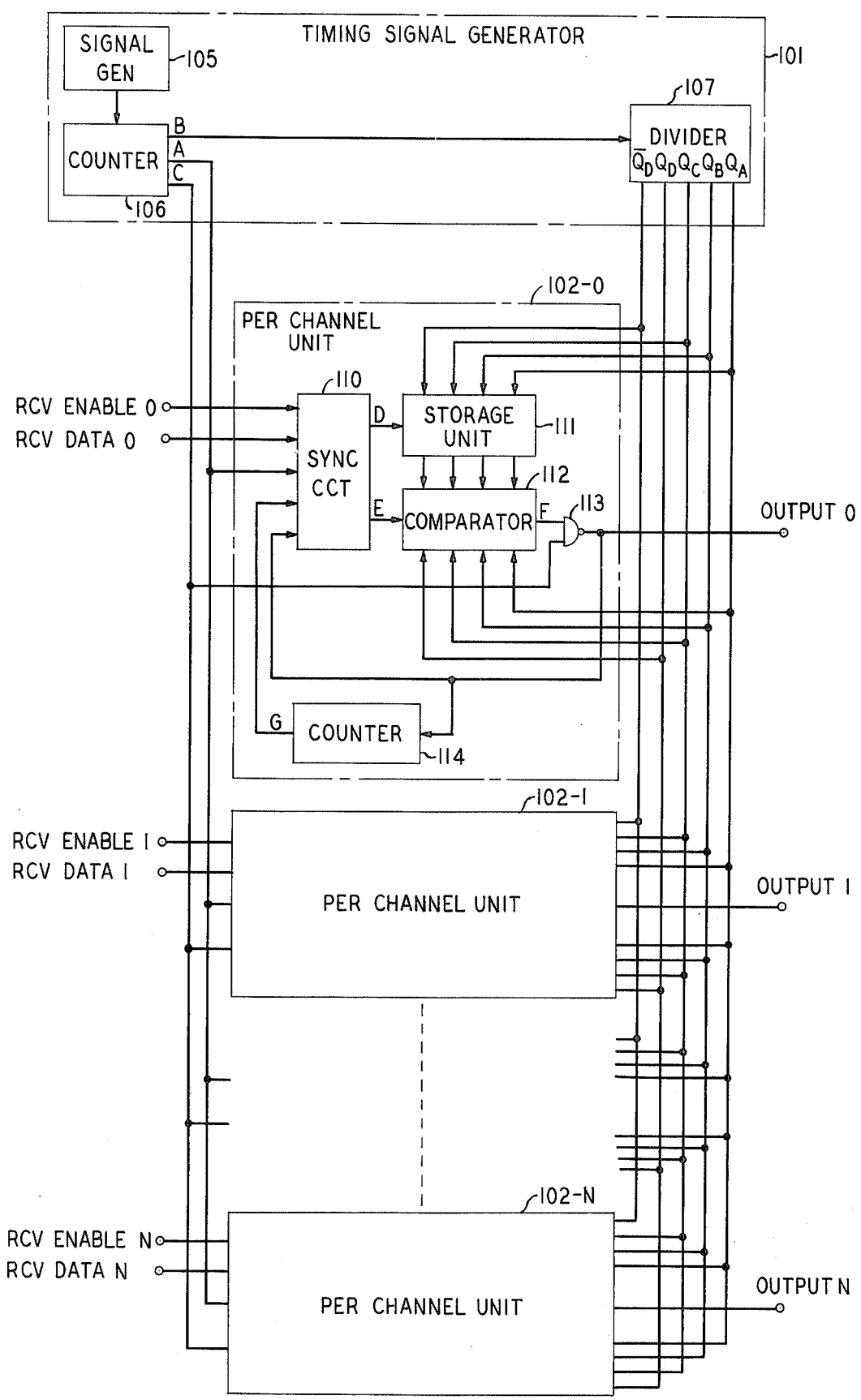
FIG. 1 is a simplified block diagram depicting a sample pulse generator illustrating one embodiment of the invention.
Figure 2:
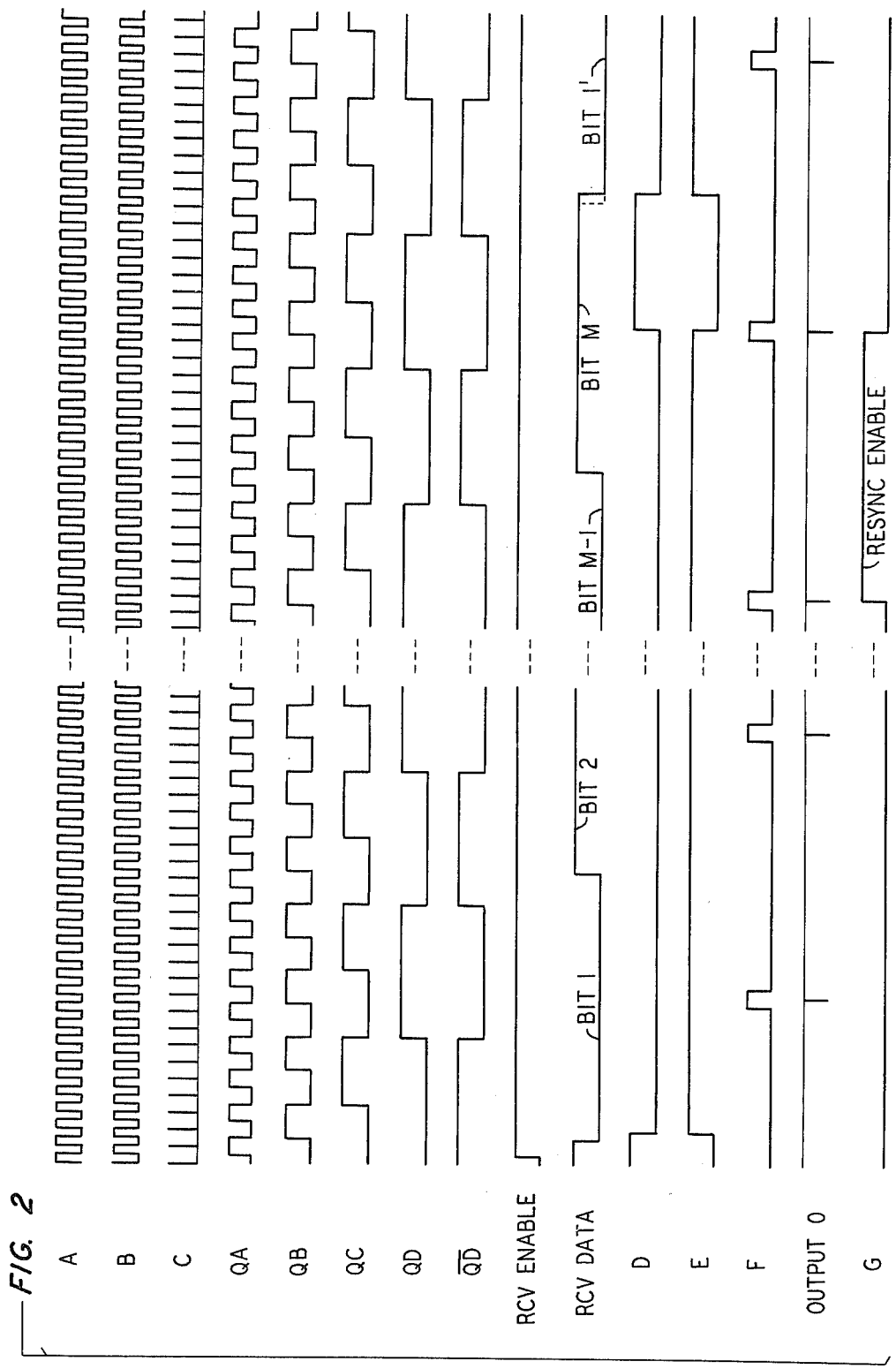
FIG. 2 shows waveforms generated in and useful for describing operation of the sample pulse generator of FIG. 1.

FIG. 1 depicts in simplified block diagram form a sample pulse generator illustrating one embodiment of the subject invention. FIG. 2 shows waveforms of signals generated in and useful for describing operation of the sample pulse generator circuit of FIG. 1. The individual waveforms of FIG. 2 have been labeled to correspond to the circuit points indicated in FIG. 1.

Referring now to FIG. 1, there is shown timing signal generator 101 and a plurality of per channel units 102-O through 102-N. Per channel units 102 are associated on a one-to-one basis with a plurality of incoming channels. Each of units 102 is responsive to signals generated in timing signal generator 101 and to signals asynchronously received on an associated incoming channel to generate pulse signals for sampling incoming data signals on the associated channel. By employing a common timing signal generator such as 101 and per channel units such as 102-O through 102-N, the instant sample pulse generator is readily expandable to accomodate generating sample pulse signals for any desired number of incoming channels.

Accordingly, timing signal generator 101 includes signal generator 105, counter 106 and divider 107. Signal generator 105 generates clock pulse signals at a predetermined frequency or bit rate which is greater than the frequency or bit rate of the desired output sampling pulses. The clock pulse signal frequency is selected to achieve a desired accuracy or precision in the generation of the sampling pulses. In one example, a 2 MHz clock frequency is employed. Any one of numerous signal generator circuits known in the art may be employed for this purpose. Indeed, most data processing and/or data transmission systems usually employ such a clock pulse signal generator.

Clock pulse signals from signal generator 105 are supplied to counter 106 which, in turn, generates a plurality of output pulse streams or timing signals, as illustrated in waveforms A, B and C of FIG. 2. Details of counter 106 are discussed below in relation to FIG. 3. The frequency or bit rate of outputs A, B and C of counter 106 is selected to be a multiple of the frequency or bit rate of the desired sampling pulses, for example, approximately 16 times the sampling rate. In one example, the frequency of signals generated in counter 106 is approximately 19.2 kHz while the sampling pulse rate is 1200 bits per second.

Signals as shown in waveforms A and C of FIG. 2 are supplied from counter 106 to each of per channel units 102-O through 102-N, while signals as shown in waveform B of FIG. 2 are supplied from counter 106 to divider 107.

Divider 107 responds to signals from counter 106, as shown in waveform B of FIG. 2, to generate a plurality of timing signals, namely QA, QB, QC, QD and $\overline{QD}$ as shown in the corresponding waveforms of FIG. 2. These timing signals are in predetermined phase relationship and are supplied to each of per channel units 102-O through 102-N. Any one of numerous digital divider arrangements known in the art may be employed for this purpose, for example, a digital counter or the like.

Each of per channel units 102-O through 102-N is structurally and functionally identical. Therefore only one channel unit, namely 102-O, is shown and will be described in detail. Accordingly, each of per channel units 102 includes sync circuit 110, storage unit 111, comparator 112, NAND gate 113, and counter 114. It should be noted here that in certain applications the function of counter 114 may be externally supplied from a central processor unit in a computer system or the like.

A first predetermined group of the timing signals generated by divider 107, for example, those developed at outputs QA, QB, QC and $\overline{QD}$, are supplied to each storage unit 111. Similarly, a second predetermined group of the timing signals generated by divider 107, for example, those developed at outputs QA, QB, QC and QD, are supplied to each comparator 112. Signals developed at output A of counter 106 are supplied to each of sync circuits 110 and signals generated at output C of counter 106 are supplied to each of NAND gates 113. Sync circuit 110 responds to signals asynchronously received on an associated incoming channel, namely, RCV ENABLE and RCV DATA for controllably generating first and second prescribed output signals, namely, outputs D and E. Signals generated at output A of counter 106, as shown in waveform A of FIG. 2, control sync circuits 110 so that outputs D and E are not generated when outputs QA, QB, QC, QD and $\overline{QD}$ of divider 107 are changing state. Otherwise, possible errors may result in the position of the resultant sample pulse being generated. This control of sync circuit 110 is achieved by output A of counter 106 being opposite in phase to output B, as will be apparent to those skilled in the art.

As is known, in asynchronous systems the transmission of data signals is characterized by reception of a RCV ENABLE signal, for example, a high state signal representative of a logical 1 indicating reception of a carrier signal at which time the RCV DATA signal is known to be in a high state, also representative of a logical 1. Then, the first transition of the RCV DATA signal to a low state, i.e., representative of a logical 0, is defined as the beginning of the START or SYNC data bit, for example, BIT 1 shown in waveform RCV DATA of FIG. 2. Each of sync circuits 110 is responsive to the RCV ENABLE and RCV DATA signals incoming on an associated incoming channel for generating outputs D and E. Thus, as seen from the waveforms of FIG. 2, upon receiving a logical 1 RCV ENABLE signal while RCV DATA is a logical 1 and, subsequently, RCV DATA changes to a logical 0 and outputs D and E are caused to change state, for example, output D goes from a high to a low while output E goes from a low to a high. It should be noted that the change of state of outputs D and E of sync circuit 110 occurs under control of the signal generated at output A of counter 106. As noted above, this insures that outputs D and E are not generated when the outputs from divider 107 are changing state. Output D from sync circuit 110 is supplied to and controls loading of storage unit 111 while output E is supplied to and controls enabling of comparator 112, in a manner which will be apparent to those skilled in the art.

It is also important that sync circuit 110 has the capability to resynchronize itself. This is important so that the effect of cumulative errors in the position of the sample pulse relative to the midpoint of the RCV DATA bits are minimized. In the instant embodiment of the invention, there can be a ±1/32 of a bit error in the position of the sample pulse being generated relative to mid-interval. That is, the sample pulse may be mispositioned by one-half the rate of output A from counter 106. In numerous systems resynchronization is controlled by a central processor under program control. However, in systems employing synchronous processor units, for example, so-called microprocessors now becoming common in the art, the processor may not have the capability of resynchronizing a plurality of channels during the synchronous time slot allocated therefor. This function is effected in sync circuit 110 by employing counter 114 to generate a RESYNC ENABLE signal one bit, i.e., bit (M-1) prior to the termination of the presently incoming data character, for example, after counting 25 bits of a 26-bit character, so that sync circuit 110 may resynchronize itself on the START bit of the next incoming character. This need to resynchronize is especially critical in systems in which there is no break or interval between successive data characters. This resynchronization procedure will be discussed further below in connection with the discussion of the details of sync circuit 110 in relation to FIG. 3.

As indicated above, first predetermined ones of the timing signals generated by divider 107, namely, QA, QB, QC and $\overline{QD}$, are supplied to storage unit 111. Storage unit 111 may be any one of numerous storage devices known in the art. Preferably, storage unit 111 includes a controllable storage element or so-called "snap-shot" register which responds to output D from sync circuit 110 to store signals representative of timing signals QA, QB, QC and $\overline{QD}$ generated at the instant a signal on output D changes from a first state to a second state, for example, from a logical 1 to a logical 0 as shown in waveform D of FIG. 2. Thus, in this example, storage unit 111 stores signals representative of QA = 0, QB = 1, QC = 0, and $\overline{QD}$ = 1.

Comparator 112 is connected in circuit with outputs from storage unit 111 and, therefore, is supplied with the signals stored in unit 111, namely, QA, QB, QC and $\overline{QD}$ (0101). Comparator 112 is also supplied with second predetermined ones of the timing signals generated by divider 107, namely QA, QB, QC and QD. Comparator 112 is enabled by output E from sync circuit 110 to make comparisons between the signals stored in storage unit 111 and those occurring on outputs QA, QB, QC and QD from divider 107. Thus, when QA, QB, QC and QD = 0101, comparator 112 yields an output. Since the frequency of waveform A supplied to divider 107 is 16 times the desired sample pulse rate, 16 pulses are generated per data bit interval. Consequently, the sample pulse for data bit 1 must be generated upon the occurrence of the 8th pulse after the sampling of timing signals QA, QB, QC and QD has occurred, while each subsequent sample pulse is to be generated at 16 pulse intervals starting from the first sample pulse. This is achieved in accordance with an aspect of the instant invention by sampling and storing first timing signals ordered from least significant to most significant, namely QA, QB, QC and QD, respectively, at the beginning of bit 1 and comparing them with second timing signals wherein the most significant one of the second timing signals, i.e., QD, is opposite in phase relative to the most significant signal of the first timing signals, i.e., QD. Consequently, a sample pulse is generated for bit 1 after 8 pulses of waveform B of counter 106 have occurred while subsequent sample pulses for bits 2 through M are generated at intervals of 16 pulses thereby sampling the corresponding RCV DATA bits substantially mid-interval. As noted above, the sample pulse position relative to mid-interval of the data bit may be ±½ bit of output A from counter 106. To this end, comparator 112 generates a pulse signal representative of a logical 1 during intervals that the signals stored in storage unit 111, namely, QA, QB, QC and QD, and signals QA, QB, QC and QD are in coincidence, as shown in waveform F of FIG. 2. A comparison between the stored timing signals and signals QA, QB, QC and QD occurs during several pulse intervals of waveform B of FIG. 2, as shown in waveform F.

Since it is desired to sample the corresponding data bits at substantially mid-interval it becomes necessary to strobe appropriately the output of comparator 112. This is achieved by employing NAND gate 113 which responds to signals from output C of counter 106 and the output from comparator 112 to yield sample pulse signals as shown in the waveform designated output in FIG. 2. As indicated above, and further discussed below in connection with FIG. 3, the strobe pulses shown in waveform C of FIG. 2 are generated just prior to a change in state of waveforms A and B. This insures that the output from comparator 112 is strobed when the outputs from divider 107 are not changing state and substantially mid-interval of the incoming data bit. Otherwise, additional possible errors may occur in the position of the sample pulse being generated relative to the mid-interval point of the data bit being sampled.

Output O from NAND gate 113 is employed as desired to sample data bits incoming on the associated data channel and is also supplied to counter 114 and sync circuit 110. As indicated above, counter 114 counts the number of sample pulses generated and yields an output signal representative of a logical 1 during the interval between the sample pulse for sampling bit (M - 1) and bit M. Then, upon generation of the sample pulse for sampling bit M, sync circuit is initialized, i.e., output D is a logical 1 and output E is a logical 0, as shown in waveforms D and E, respectively, of FIG. 2, and sync circuit 110 is ready to be resynchronized on the next RCV START or SYNC bit whether it be immediately after bit M of the last received character or some time in the future, as will be apparent from waveforms RCV DATA, D and E of FIG. 2. Details of sync circuit 110 and its operation are discussed below in relation to FIG. 5.

In summary, each of per channel units 102-O through 102-N operates independently of the other per channel units to generate sample pulses for sampling asynchronously received data bits on the associated ones of incoming channels O through N in a manner essentially the same as described above for unit 102-O. Consequently, the subject invention may readily be employed for generating sample pulse signals for sampling any desired number of incoming channels, from one to a plurality of channels as desired.

Figure 3:
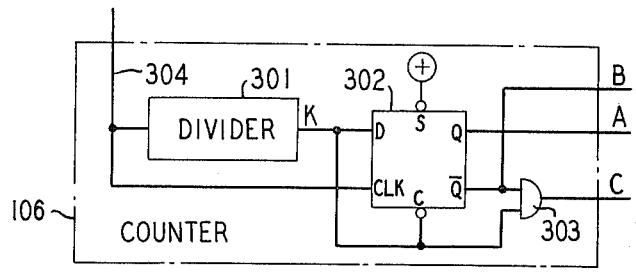
FIG. 3 depicts details of the counter circuit employed in the sample pulse generator of FIG. 1.
Figure 4:
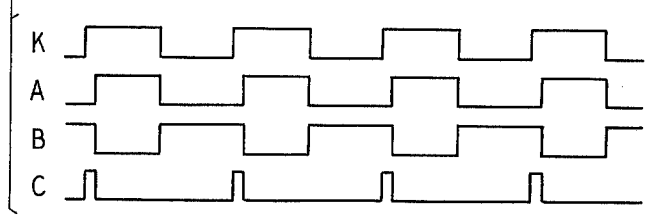
FIG. 4 shows waveforms generated in and useful for describing operation of the counter circuit of FIG. 3.

FIG. 3 shows details of counter 106 utilized in timing signal generator 101 of FIG. 1. FIG. 4 shows waveforms of signals generated in and useful for describing operation of counter 106. The individual waveforms of FIG. 4 have been labeled to correspond to the circuit points indicated in FIG. 3. Accordingly, shown in FIG. 3 are divider 301, D-type flip-flop 302 and AND gate 303. Clock pulse signals from signal generator 105 (FIG. 1) are supplied via circuit path 304 to divider 301 and CLK input of flip-flop 302. Divider 301 is operative in well-known fashion to generate a pulse signal as shown in waveform K of FIG. 4. The frequency of pulse rate of the output signal from divider 301 is a predetermined multiple of the desired sampling pulse rate. In this example, it is 16 times the desired sampling pulse rate of 1200 bits per second, i.e., approximately 19.2 kHz. The output from divider 301 is supplied to the D and CLEAR (C) inputs of flip-flop 302 and one input of AND gate 303. Waveforms A and B are generated at outputs Q and $\overline{Q}$, respectively, of flip-flop 302 as shown in the corresponding waveforms of FIG. 4. Output $\overline{Q}$ of flip-flop 302 is supplied to a second input of AND gate 303. Output C of counter 106 is generated at the output of AND gate 303. Operation of counter 106 is such that the transitions of outputs Q and $\overline{Q}$ of flip-flop 302, as shown in waveforms A and B of FIG. 4, are delayed for one clock pulse interval of signal generator 105 (FIG. 1). This, in turn, causes the narrow pulse signal, i.e., one clock pulse in width, of waveform C to be generated prior to the low-to-high transition of waveform A and the high-to-low transition of waveform B, again as shown in FIG. 4.

Figure 5:
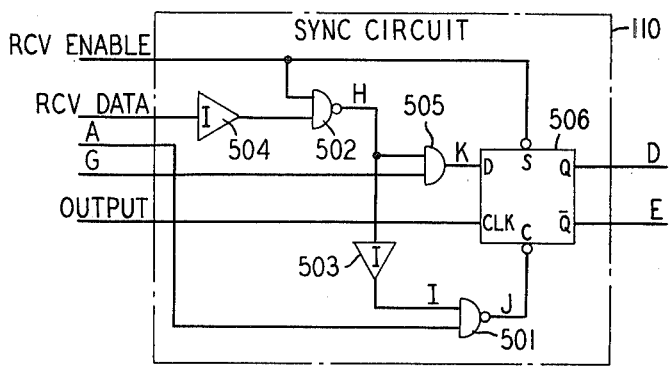
FIG. 5 depicts details of the sync circuits employed in the sample pulse generator of FIG. 1.
Figure 6:
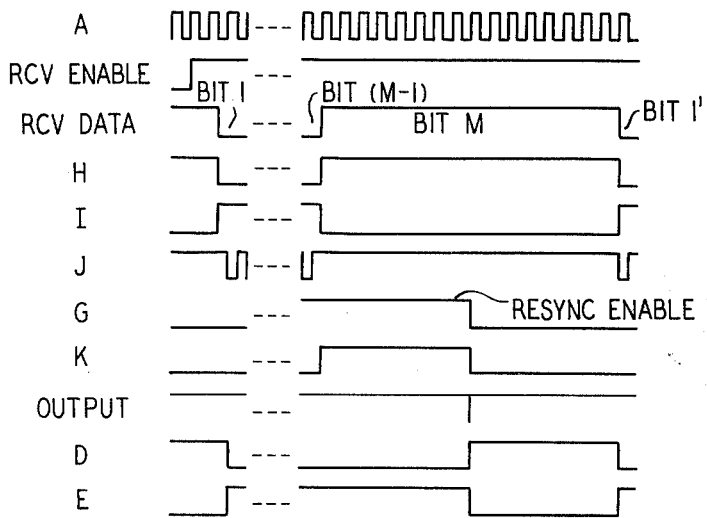
FIG. 6 depicts waveforms useful in describing the operation of the sync circuits of FIG. 5.

FIG. 5 shows details of sync circuit 110. FIG. 6 shows waveforms of signals useful for describing operation of the sync circuit of FIG. 5. The individual waveforms of FIG. 6 have been labeled to correspond to the circuit points indicated in FIG. 5. Accordingly, each of sync circuits 110 includes NAND gates 501 and 502, inverters 503 and 504, AND gate 505, and D-type flip-flop 506. Let us first consider operation of sync circuit 110 for initially generating the storage unit load and comparator enable signals. To this end, a signal as shown in waveform A of FIG. 6 is supplied to one input of NAND gate 501 for controllably enabling sync circuit 110. Since the output of NAND gate 502 is initially a logical 1, as shown in waveform H of FIG. 6, the output of inverter 503 is a logical 0, as shown in waveform I and the output of NAND gate 501 is a logical 1 as indicated by waveform J. Upon receiving a RCV ENABLE logical 1 signal, flip-flop 506 is SET so that output Q is a logical 1 and $\overline{Q}$ is a logical 0, as shown in waveforms D and E, respectively, of FIG. 6. Additionally, since RCV DATA is a logical 1, the output of inverter 504 is a logical 0 and the output of NAND gate 502 remains a logical 1, as shown in waveform H of FIG. 6. In turn, the logical 1 output from gate 502 inhibits NAND gate 501 via inverter 503 and enables AND gate 505. However, the output of AND gate 505 remains a logical 0, as shown in waveform K of FIG. 6. Reception of the START or SYNC bit, i.e., bit 1 on RCV DATA which is a logical 0, as shown in the corresponding waveform of FIG. 6, enables NAND gate 502 via inverter 504, thereby causing the output of NAND gate 502 to become a logical 0, as shown in waveform H of FIG. 6. In turn, AND gate 505 is inhibited while NAND gate 501 is enabled via inverter 503. Consequently, the next pulse of waveform A supplied to NAND gate 501 causes flip-flop 506 to be cleared and output Q of flip-flop 506 changes state to a logical 0 and output Q̄ changes state to a logical 1, as shown in waveforms D and E, respectively. These are the storage unit load and comparator enable signals, respectively.

Reinitalization or resynchronization of sync circuit 110 is effected by employing the output from counter 114, i.e., a RESYNC ENABLE signal as shown in waveform G of FIG. 6, in conjunction with the sample pulse output and RCV DATA incoming signals. As indicated above, counter 114 yields a RESYNC ENABLE signal (logical 1) after generation of the (M - 1)th sample pulse which remains until generation of the Mth sample pulse. The RESYNC ENABLE signal, as shown in waveform G of FIG. 6, enables AND gate 505. Consequently, when the STOP bit, i.e., bit M, which is a logical 1, of the presently incoming data character is received the output of NAND gate 502 becomes a logical 1, as shown in waveform H of FIG. 6, and AND gate 505 yields a logical 1 output as shown in waveform K. As is known, the Q output of D-type flip-flop 506 assumes the state of the D input when a clock signal is supplied to the CLK input. Thus, upon generation of sample pulse M, as shown in the waveform designated OUTPUT in FIG. 6, outputs Q and Q̄ of flip-flop 506 become logical 1 and logical 0, respectively, as shown in waveforms D and E, respectively, and sync circuit 110 is initialized to synchronize on the START bit of the next received character, for example, Bit 1'.

The above-described arrangements are, of course, merely illustrative of applications of the inventive principles disclosed herein. Numerous other arrangements may be devised by those skilled in the art without departing from the spirit or scope of the inventive principles.

What is claimed is:

1. Apparatus for generating signals for sampling data signals asynchronously received at a prescribed bit rate on at least one channel which comprises:
   means for generating a plurality of timing signals in predetermined phase relationship ordered from least significant to most significant and including a timing signal opposite in phase to said most significant timing signal, a first predetermined group of said timing signals including the least significant one through the next to most significant one of said timing signals and the signal opposite in phase to said most significant timing signal, and a second predetermined group of said timing signals including the least significant one through the most significant one of said timing signals;
   storage means associated with said at least one channel and being responsive to a first prescribed signal for sampling and storing signals representative of one of said predetermined groups of said timing signals; and
   means associated with said storage means and being supplied with said stored signals and with the other of said predetermined groups of said timing signals for generating output signals during intervals in which said first and second predetermined groups of said timing signals are in coincidence, wherein said first and second predetermined groups of said timing signals are in said predetermined phase relationship so that an output signal is generated substantially mid-interval of each data bit incoming on said at least one channel.

2. The apparatus as defined in claim 1 wherein said timing signal generating means includes first means for generating at least a first pulsating signal having a frequency which is a predetermined multiple of said incoming data bit rate and digital divider means responsive to said at least first pulsating signal for generating said plurality of timing signals.

3. The apparatus as defined in claim 2 further including at least one second means associated with said at least one channel and being responsive to prescribed signals incoming on said at least one channel for generating said first prescribed signal and a second prescribed signal.

4. Apparatus for generating signals for sampling data signals asynchronously received at a prescribed bit rate on at least one channel which comprises:
   means for generating a plurality of timing signals in predetermined phase relationship, including
   counter means for generating a first pulsating signal having a frequency which is a predetermined multiple of said prescribed bit rate, a second pulsating signal having a frequency the same as said first pulsating signal and oppositely phased and a third pulsating signal having a predetermined phase relationship to said first and second pulsating signals, and
   digital divider means responsive to said first pulsating signal for generating first and second predetermined ones of said timing signals;
   means associated with said at least one channel and being responsive to said second pulsating signal and to prescribed signals incoming on said at least one channel for generating a first prescribed signal and a second prescribed signal at an instant when said first and second predetermined ones of said timing signals are not changing state;
   storage means associated with said at least one channel and being responsive to said first prescribed signal for sampling and storing signals representative of said first predetermined ones of said timing signals; and
   means associated with said storage means and being supplied with said stored signals and with said second predetermined ones of said timing signals for generating output signals during intervals in which said first and second predetermined ones of said timing signals are in coincidence, wherein said first and second predetermined ones of said timing signals are in said predetermined phase relationship so that an output signal is generated substantially mid-interval of each data bit incoming on said at least one channel.

5. The apparatus as defined in claim 4 wherein said output signal generating means includes comparator means responsive to said second prescribed signal for effecting a comparison between said stored first timing signals and said second timing signals, and means supplied with an output from said comparator means and said third pulsating signal for generating said output signals during intervals of coincidence between said comparator means output signal and said third pulsating signal.

6. The apparatus as defined in claim 5 further including means for supplying a third prescribed signal indicative of the interval between the next to last data bit and last data bit in a data character incoming on said at least one channel, and wherein said first and second prescribed signal generating means further includes means responsive to said third prescribed signal for initializing said prescribed signal generating means for generating said first and second prescribed signals in response to reception of a first bit of the next incoming data character received on said at least one channel.

7. Apparatus for generating signals for sampling incoming data signals asynchronously received at a prescribed bit rate on a plurality of channels which comprises:

means for generating a plurality of timing signals in predetermined phase relationship ordered from least significant to most significant and including a timing signal opposite in phase to said most significant timing signal, a first predetermined group of said timing signals including the least significant one through the next to most significant one of said timing signals and the signal opposite in phase to said most significant timing signal, and a second predetermined group of said timing signals including the least significant one through the most significant one of said timing signals; and a plurality of first means supplied with said timing signals and being associated on a one-to-one basis with said incoming channels, each of said first means including storage means responsive to a first prescribed signal for sampling and storing signals representative of one of said predetermined groups of said timing signals, and means associated with said storage means and being supplied with said stored signals and with the other of said predetermined groups of said timing signals for generating output signals during intervals in which said first and second predetermined groups of said timing signals are in coincidence, wherein said first and second predetermined groups of said timing signals are in said predetermined phase relationship so that said output signals are generated substantially mid-interval of each data bit incoming on said associated channel.

8. The apparatus as defined in claim 7 wherein each of said first means further includes second means responsive to prescribed signals incoming on an associated one of said channels for generating said first prescribed signal and a second prescribed signal, and wherein said output signal generating means includes comparator means responsive to said second prescribed signal for effecting a comparison between said stored group of timing signals and said other group of timing signals.

9. The apparatus as defined in claim 8 wherein said timing signal generating means includes third means responsive to a supplied signal for generating at least a first pulsating signal having a frequency which is a predetermined multiple of said prescribed bit rate, and digital divider means responsive to said at least first pulsating signal for generating said plurality of timing signals.

10. Apparatus for generating signals for sampling incoming data signals asynchronously received at a prescribed bit rate on a plurality of channels which comprises:

timing signal generating means including counter means responsive to a supplied signal for generating a first pulsating signal having a frequency which is a predetermined multiple of said prescribed bit rate, a second pulsating signal having a frequency the same as said first pulsating signal and oppositely phased and a third pulsating signal in predetermined phase relationship to said first and second pulsating signals, and digital divider means responsive to said first pulsating signal for generating a plurality of timing signals in predetermined phase relationship; and a plurality of first means supplied with said timing signals and being associated on a one-to-one basis with said channels, each including means responsive to prescribed signals incoming on an associated channel and to said second pulsating signal for generating first and second prescribed signals at an instant when said timing signals generated by said divider means are not changing state, storage means responsive to said first prescribed signal for sampling and storing signals representative of first predetermined ones of said divider means timing signals, comparator means responsive to said second prescribed signal for effecting a comparison between said stored first predetermined ones of said timing signals and second predetermined ones of said divider means timing signals, wherein said comparator means yields an output during intervals that said first and second predetermined ones of said timing signals are in coincidence, and means supplied with the output from said comparator means and said third pulsating signal for generating signals for sampling data bits on said associated channel during intervals of coincidence between said comparator means output and said third pulsating signal, wherein said first and second predetermined ones of said timing signals are in said predetermined phase relationship so that said sampling signals are generated substantially mid-interval of each data bit incoming on said associated channel.

11. The apparatus as defined in claim 10 wherein said first means further includes means for supplying a third prescribed signal indicative of the interval between the next to last data bit and last data bit of data characters incoming on said associated channel and means responsive to said third prescribed signal for initializing said first and second prescribed signal generating means to generate said first and second prescribed signals in response to reception of a first bit of the next incoming data character received on said associated channel.

12. The apparatus as defined in claim 11 wherein said third prescribed signal supplying means includes counter means.

* * * * *